United States Patent
Nagai et al.

(10) Patent No.: US 9,239,113 B2
(45) Date of Patent: Jan. 19, 2016

(54) SEAL RING

(75) Inventors: Junya Nagai, Niigata (JP); Tomoya Shibano, Niigata (JP); Mika Saito, Niigata (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 13/806,815

(22) PCT Filed: Jun. 22, 2011

(86) PCT No.: PCT/JP2011/064226
§ 371 (c)(1),
(2), (4) Date: Jan. 18, 2013

(87) PCT Pub. No.: WO2011/162283
PCT Pub. Date: Dec. 29, 2011

(65) Prior Publication Data
US 2013/0127120 A1 May 23, 2013

(30) Foreign Application Priority Data
Jun. 23, 2010 (JP) ................. 2010-142593

(51) Int. Cl.
| F16J 9/12 | (2006.01) |
| F16J 15/16 | (2006.01) |
| F16J 15/44 | (2006.01) |
| F16H 61/00 | (2006.01) |

(52) U.S. Cl.
CPC ............ *F16J 15/16* (2013.01); *F16J 15/441* (2013.01); *F16H 2061/0046* (2013.01)

(58) Field of Classification Search
CPC ......... F16J 15/441; F16J 15/002; F16J 15/16; F16J 15/3272
USPC .......... 277/435, 447, 452, 459, 460, 465, 500
See application file for complete search history.

(56) References Cited

U.S. PATENT DOCUMENTS

| 5,632,494 A | 5/1997 | Oka |
| 7,523,944 B2 * | 4/2009 | Hatori ........................... 277/460 |
| 2006/0055119 A1 | 3/2006 | Hatori |

FOREIGN PATENT DOCUMENTS

| JP | 3-67760 U | 7/1991 |
| JP | 8-121603 A | 5/1996 |
| JP | 3437312 B2 | 8/2003 |
| WO | 2004/090390 A1 | 10/2004 |

OTHER PUBLICATIONS

International Search Report for PCT/JP2011/064226 dated Aug. 9, 2011.

* cited by examiner

*Primary Examiner* — Gilbert Lee
(74) *Attorney, Agent, or Firm* — Kenealy Vaidya LLP

(57) ABSTRACT

Provided is a seal ring that has low-leakage characteristics and low-friction characteristics and can improve the drive loss of the automatic transmission of an automobile to thereby contribute to an improvement in the fuel consumption of the automobile. The seal ring is attached to a shaft groove formed on the outer peripheral surface of a shaft. A plurality of peripherally spaced recessed sections are formed on at least the inner peripheral side of a contact side-surface. Inner walls are provided on the inner peripheral side of the recessed sections, and oil introduction openings that open on an inner peripheral surface are provided on the inner peripheral side of the recessed sections. The inner walls may be provided on opposite peripheral sides of the recessed sections but may be provided only on the rear side in the rotation direction.

16 Claims, 6 Drawing Sheets

SEAL RING

This application is a U.S. national phase filing under 35 U.S.C. §371 of PCT Application No. PCT/JP2011/064226, filed Jun. 22, 2011, and claims priority under 35 U.S.C. §119 to Japanese patent application no. 2010-142593, filed Jun. 23, 2010, the entireties of both of which are incorporated by reference herein.

FIELD

The present invention relates to a seal ring and particularly to a seal ring used for hydraulic apparatuses such as automatic transmissions of automobiles.

BACKGROUND

In recent years, there is a demand to reduce the drive loss of the automatic transmission of an automobile, in order to improve the fuel consumption of the automobile. For the purpose of hydraulic sealing, a seal ring is attached to the automatic transmission. However, the friction loss of the seal ring leads to the drive loss of the automatic transmission. Therefore, one important task is to reduce the friction of the seal ring. In addition, the capacity of an oil pump of the automatic transmission is a significant factor that causes the drive loss, and therefore there is a demand to reduce the amount of oil leakage from the seal ring to thereby reduce the capacity of the oil pump. To reduce the drive loss of the automatic transmission to thereby improve the fuel consumption of the automobile, it is necessary for the seal ring to have low-friction characteristics and low-leakage characteristics.

Figure 1:
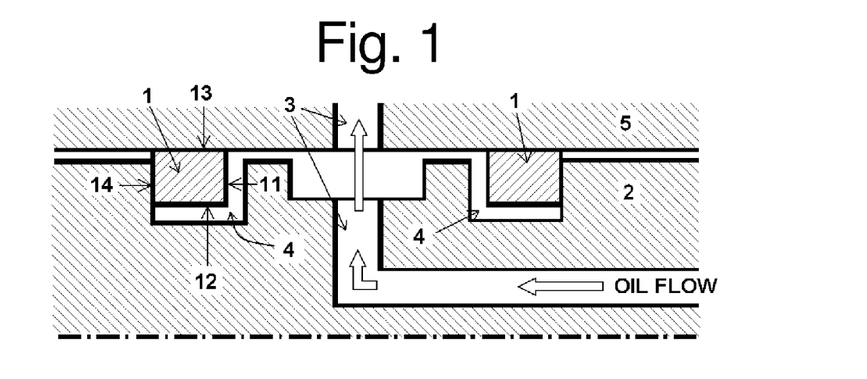
FIG. 1 is a cross-sectional view illustrating a hydraulic circuit having a seal ring attached thereto.

FIG. 1 shows the basic structure of a hydraulic circuit using a seal ring. The seal ring 1 is attached to a shaft groove (ring groove) 4 formed on the outer peripheral surface of a shaft 2 and disposed on opposite axial sides of a hydraulic passage 3. Hydraulic oil supplied from the hydraulic passage 3 is received by the pressure-receiving side-surface 11 and inner peripheral surface 12 of the seal ring. The outer peripheral surface 13 of the seal ring is in contact with the inner surface of a housing 5, and the contact side-surface 14 of the seal ring is in contact with a side surface of the shaft groove 4. The hydraulic pressure is thereby sealed. Generally, the shaft 2 is rotatable, and the housing 5 is stationary. However, a combination of a stationary shaft and a rotatable housing may be used.

A method generally used to reduce the friction (friction loss) of a seal ring is to reduce a pressurizing load for pressing the contact side-surface of the seal ring that serves as a principal sliding surface against the ring groove. More specifically, a seal ring having a cross-sectional shape that allows the pressure of supplied oil to act between the contact side-surface of the seal ring and the ring groove is used to reduce the pressurizing load by the action of a cancelling load.

Patent Literature 1 discloses a method of reducing a pressurizing load by using a seal ring including side surfaces forming a tapered shape having an axial width that decreases from an outer peripheral side toward an inner peripheral side. With this configuration, a cancelling load is generated between a ring groove and a side surface of the seal ring. The tapered shape formed by the side surfaces can significantly reduce the pressurizing load and is currently known as the shape of a seal ring that can minimize friction.

Patent Literature 2 discloses a seal ring including: peripherally spaced recessed sections (pockets) 6 formed at least on the inner peripheral side of a contact side-surface; and pillar sections 7 disposed between the recessed sections 6, as shown in FIG. 2(A). As shown in FIGS. 2(B) and 2(C), each recessed section 6 includes: a deepest inclined portion 51 formed such that the axial width (thickness) of the seal ring decreases in an inner peripheral direction; and converging portions 52 that are located on opposite peripheral sides of the deepest inclined portion 51 and converge toward the innermost peripheral points of adjacent pillar sections 7. In this configuration, when the seal ring rotates, the oil filling the recessed sections 6 is squeezed along inclined surfaces of converging portions 52, and a lift 60 is thereby generated. In addition, hydraulic pressure acts on the recessed sections 6 on the contact side-surface. This causes a pressing load reduction effect (cancelling pressure 61), and friction is thereby reduced. In the seal ring in Patent Literature 2, a side surface of the seal ring is in surface contact with the ring groove and slides thereon, as shown in FIG. 2(D). Therefore, no leakage passage is formed in a gap of the abutment joint of the seal ring, and low-leakage characteristics are thereby obtained.

In the seal ring in Patent Literature 1, the sliding contact between a side surface of the seal ring and the ring groove is line contact, and the circular sliding line is located on the gap of the abutment joint of the seal ring. This causes a problem in that the oil leaks from the gap of the abutment joint. Although the use of the recessed sections in Patent Literature 2 allows a reduction in friction, the degree of reduction is lower than that in the seal ring in Patent Literature 1. Therefore, there is a demand to further reduce the friction.

CITATION LIST

Patent Literature

Patent Literature 1: Japanese Patent No. 3437312
Patent Literature 2: WO2004/090390

SUMMARY

Technical Problem

The present invention has been made in view of the foregoing circumstances, and it is an object to provide a seal ring that has low-friction characteristics and also low-leakage characteristics, can reduce the drive loss of the automatic transmission of an automobile, and can contribute to an improvement in the fuel consumption of the automobile.

Solution to Problem

In view of the above object, the present inventors have made extensive studies and found that, in a seal ring including peripherally spaced recessed sections formed on the inner peripheral side of a contact side-surface and pillar sections disposed between the recessed sections, friction can be reduced by providing inner walls on the inner peripheral side of the recessed sections and also providing oil introduction openings that open on the inner peripheral surface of the seal ring. Thus, the invention has been completed. More specifically, the seal ring of the present invention is a seal ring attached to a shaft groove formed on the outer peripheral surface of a shaft and is characterized in that a plurality of peripherally spaced recessed sections are formed on at least the inner peripheral side of the contact side-surface of the seal ring and that an inner wall and an oil introduction opening that opens on the inner peripheral surface are provided on the inner peripheral side of each of the recessed sections.

Advantageous Effects of Invention

In the present invention, inner walls are formed on the inner peripheral side of the recessed sections formed on the contact side-surface of the seal ring, and oil introduction openings that open on the inner peripheral surface are provided. By providing the inner walls in the recessed sections, oil introduced through the oil introduction openings is led to wedge-shaped inclined surfaces located in peripheral ends of the recessed sections. A lift is thereby generated, and an oil film is formed on each pillar section. This causes the pillar sections to float up and facilitates introduction of the oil onto an annular sealing surface located on the outer peripheral side of the recessed sections. The state of the sealing surface approaches a fluid lubrication state, and the coefficient of friction is thereby reduced. In addition, hydraulic pressure acts on the recessed sections on the contact side-surface, and the pressing load is thereby reduced. In the seal ring of the present invention, as a result of the synergetic effect of these two effects, the friction can be effectively reduced. In the seal ring of the present invention, the contact side-surface is in surface contact with a side surface of the ring groove, and therefore oil leakage can be suppressed. As described above, the seal ring of the present invention has low-friction characteristics and also low-leakage characteristics. Therefore, the drive loss of an automatic transmission can be effectively reduced.

DESCRIPTION OF EMBODIMENTS

The seal ring of the present invention will next be described in detail with reference to the drawings.

Figure 2:
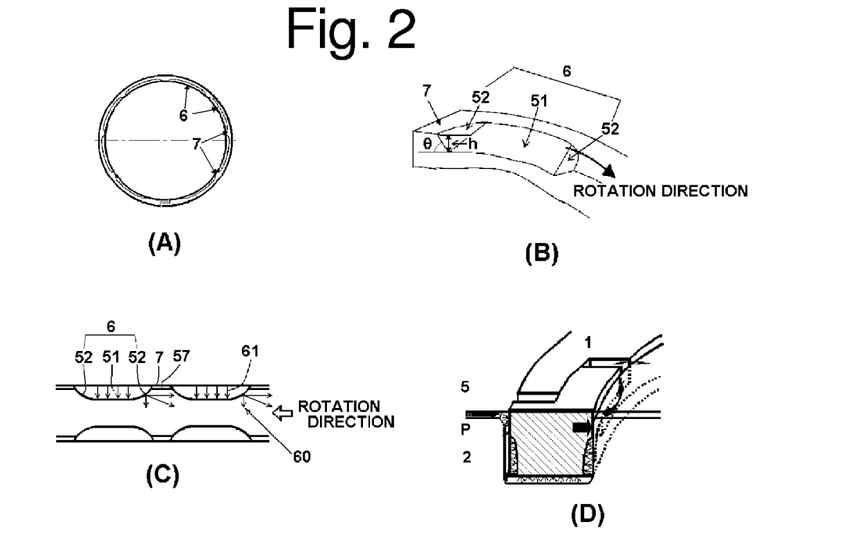
FIG. 2(A) is a plan view illustrating the structure of a seal ring described in Patent Literature 2.
FIG. 2(B) is a perspective view of the structure of the seal ring.
FIG. 2(C) is a linear development view in a circumferential direction illustrating the shape of recessed sections as viewed from an inner peripheral surface.
FIG. 2(D) is a schematic diagram illustrating the seal ring described in Patent Literature 2, with the seal ring being attached to a ring groove.
Figure 3:
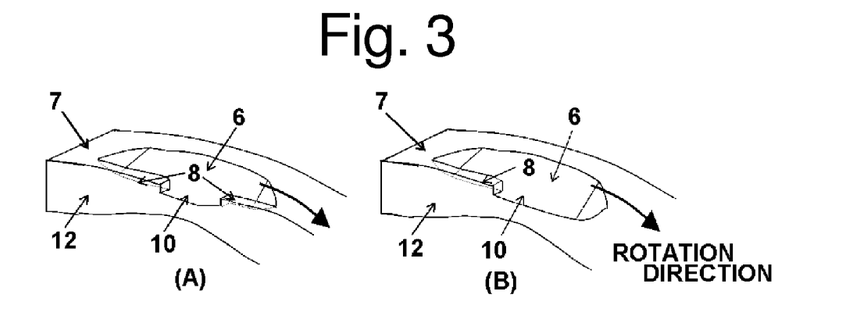
FIG. 3(A) is a perspective view illustrating an embodiment of the seal ring of the present invention.
FIG. 3(B) is a perspective view illustrating another embodiment of the seal ring.

FIG. 3 is a set of perspective views illustrating embodiments of the seal ring of the present invention. The shapes of recessed sections in FIG. 3 are basically same as the shape of the recessed sections described in Patent Literature 2, i.e., the shape of the recessed sections shown in FIG. 2. The recessed sections 6 are formed on at least the inner peripheral side of the contact side-surface of the seal ring and spaced apart from each other in a circumferential direction, and pillar sections 7 are disposed between the recessed sections 6. As shown in FIG. 2(B), each recessed section 6 includes: a deepest inclined portion 51 formed such that the axial width (thickness) of the seal ring decreases in an inner peripheral direction; and converging portions 52 that are located on opposite peripheral sides of the deepest inclined portion 51 and converge toward the innermost circumferential points of adjacent pillar sections 7. With the recessed sections 6 having the above shape, when the seal ring rotates, oil filling the recessed sections 6 is squeezed along converging portions 52, and a lift perpendicular to the rotation direction is generated by the wedge-shape effect of the converging portions 52. In addition, hydraulic pressure acts on recessed sections 6 on the contact side-surface side. This results in a reduction in a pressing load, and friction is thereby reduced.

In the example in FIG. 2(B), the angle between the inclined surface of a converging portion and a side surface of the seal ring, i.e., the angle θ of the inclined surface in FIG. 2(B), is set to 16°, and the depth "h" of the deepest inclined portion 52, i.e., the axial depth "h" of the converging portion 52 at an inner peripheral edge is set to 0.42 mm.

The number of recessed sections 6 (the number of recessed sections formed on one side of one seal ring) is preferably 4 to 16 and more preferably 8 to 12. The peripheral width of the recessed sections 6 is preferably 8 to 50 times the peripheral width of the pillar sections 7, and the peripheral width of one converging portion 52 is preferably equal to or larger than 1/50 of the peripheral width of the deepest inclined portion 51.

The seal ring of the present invention is characterized in that inner walls 8 are provided on the inner peripheral side of the recessed sections 6 and that oil introduction openings 10 that open on the inner peripheral surface 12 are provided. In FIG. 3(A), the inner walls 8 extend from opposite peripheral ends of a recessed section 6 along its inner peripheral edge, and an opening used as an oil introduction opening 10 is provided at the center of the inner peripheral edge. By providing walls, i.e., inner walls 8, on the inner peripheral side of each recessed section 6, the flow of oil introduced into the recessed section 6 and squeezed therein from a wedge-shaped inclined surface (a converging portion) to the inner peripheral surface 12 is suppressed. A larger lift is thereby generated by a three-dimensional squeezing effect caused by the cross-sectional depth of the wedge and in the circumferential direction, and an oil film is formed on each pillar section 7. This causes the pillar sections 7 to float up and facilitates introduction of the oil onto an annular sealing surface located on the outer peripheral side of the recessed sections 6, and the coefficient of friction is thereby reduced. In addition, hydraulic pressure acts on the recessed sections 6 on the contact side-surface, and the pressing load is thereby reduced. As a result of the synergetic effect of these two effects, the friction is reduced. When the inner walls 8 are provided on opposite sides of each recessed section 6, i.e., on opposite sides of each oil introduction opening 10, as in this embodiment, the peripheral length of one inner wall 8 is preferably 20% to 45% of the total peripheral length of one recessed section 6 (the total of the length of the deepest inclined portion and the lengths of the converging portions), and the total length of inner walls on both sides is preferably 40% to 90% of the total peripheral length of one recessed section 6. In these ranges, a higher wedge-shape effect is obtained, and the friction is further reduced.

The advantageous effects of the present invention are obtained by forming recessed sections 6 each including inner walls 8 and an oil introduction opening 10 on the contact side-surface of the seal ring. The shape of each recessed section 6 in this embodiment is peripherally symmetric with respect to the circumferential center. Therefore, in consideration of workability, it is preferable to provide recessed sections 6 on both the contact side-surface and pressure-receiving side-surface of the seal ring such that each of these side surfaces is symmetric and not directional.

In FIG. 3(A), the inner walls 8 are provided on opposite sides of the recessed section 6. However, in FIG. 3(B), an inner wall 8 is disposed only in the edge portion of an inclined surface (converging portion) on the rear side in the rotation direction. In this embodiment, the clockwise rotation of the seal ring causes the oil to be squeezed toward the end of the converging portion on the rear (left) side in the rotation direction, and a lift is thereby generated (the wedge shape effect). The wedge shape effect occurs in the converging portion on the rear side in the rotation direction. However, an oil film is less likely to be formed on the front side in the rotation direction, and a lubrication state tends to be inhibited. Therefore, in the configuration in which the inner walls 8 are provided only on the rear side in the rotation direction, a higher friction reduction effect is obtained.

When the inner walls are provided only on the rear side in the rotation direction, the peripheral length of each inner wall is preferably 5% to 95% of the total peripheral length of one recessed section and more preferably 50% to 95%. In this range, a higher wedge shape effect is obtained, and the friction is further reduced.

In these figures, the axial level of each inner wall 8 is set to be substantially the same as the level of the side surface of the seal ring, i.e., such that the end surface of the inner wall 8 is flush with a portion of the side surface on which no recessed sections 6 are formed. In FIG. 3(A), a portion in which no inner wall 8 is formed is provided in the peripherally central portion of the recessed section 6, and an oil introduction opening 10 that opens on the inner peripheral surface 12 is thereby formed between the inner walls 8. In FIG. 3(B), a portion in which no inner wall 8 is formed is provided in an end portion on the front side in the rotation direction, and an oil introduction opening 10 is thereby formed between the inner wall 8 and a pillar section 7. However, the configuration of the oil introduction openings 10 is not limited to the above configurations. For example, an inner wall 8 may be formed over the entire peripheral portion of each recessed section 6. In this case, an oil introduction opening 10 may be formed by setting the axial level of part of the inner wall 8 to be lower than the level of the side surface of the seal ring.

No particular limitation is imposed on the width of the inner walls 8, i.e., the radial length of the inner walls 8. However, to obtain a higher friction reduction effect, the radial width of the inner walls is preferably 5% to 20% of the radial width of the seal ring. When the inner walls 8 are formed such that their radial width increases toward ends of the recessed sections 6, i.e., the radial width of the recessed sections 6 decreases toward their ends, the ends of the converging portions have a shape tapered not only in the depth direction (i.e., the axial direction) but also in the radial direction, and this can further improve the three-dimensional squeezing effect. Therefore, the lift increases, and the friction is further reduced.

Figure 4:
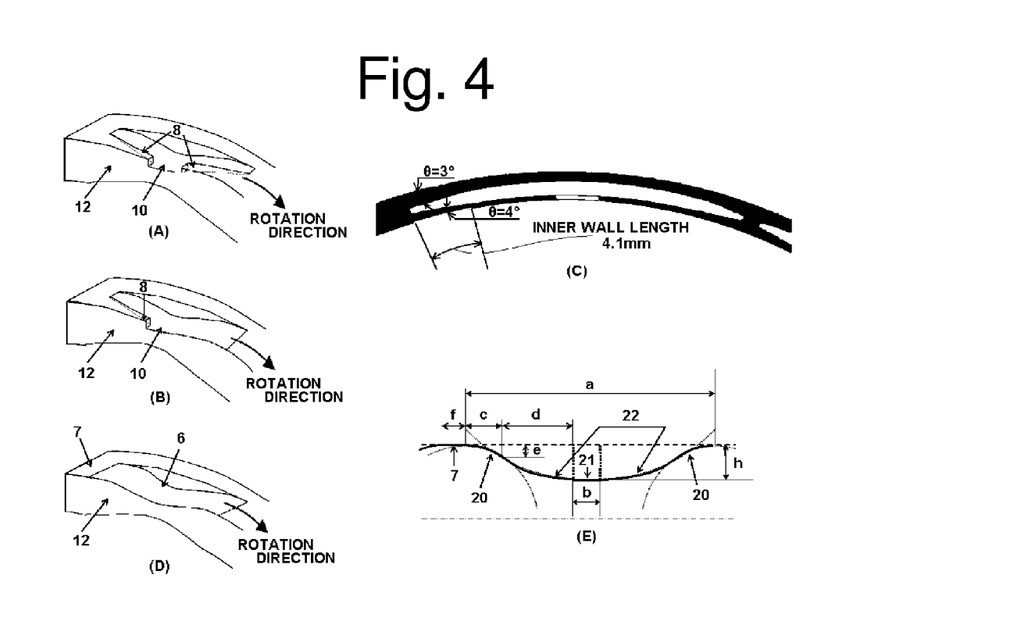
FIGS. 4(A) and 4(B) are perspective views illustrating other two embodiments of the seal ring of the present invention.
FIG. 4(C) is a scan image of the contact side-surface of the seal ring in FIG. 4(A)
FIG. 4(D) is a perspective view illustrating the shape of recessed sections of the seal rings in FIGS. 4(A) and 4(B)
FIG. 4(E) is a linear development view in the circumferential direction illustrating the shape of the recessed section in FIG. 4(D) as viewed from the inner peripheral surface.

FIGS. 4(A) and 4(B) are perspective views of other embodiments of the seal ring of the present invention, and FIG. 4(C) shows a scan image of the contact side-surface of the seal ring in FIG. 4(A). These embodiments are different in the shape of the recessed sections from the seal rings in FIGS. 3(A) and 3(B). FIG. 4(D) is a perspective view illustrating the seal ring in FIG. 4(A) with the inner walls omitted, and FIG. 4(E) is a linear development view in the circumferential direction illustrating the seal ring in FIG. 4(A) with the inner walls omitted, as viewed from the inner peripheral surface. In the following description, a liner portion in the above development view is referred to as a flat surface or a planar surface, and a curved portion is referred to as a curved surface. In this embodiment, as shown in FIG. 4(E), the opposite ends of the recessed section 6 are formed as curved surfaces convex toward the pillar sections 7, i.e., as squeezing portions 20 each formed of a curved surface that is convex upward in the linear development view (FIG. 4(E)) in the circumferential direction viewed from the inner peripheral surface, and are connected to the pillar sections 7. As described above, the pillar sections 7 and the recessed sections 6 are connected through gently inclined curved surfaces. Therefore, by providing the inner walls 8, an improved squeezing effect higher than that obtained using the shape of the recessed section 6 in FIG. 3(A) is obtained. The lift is thereby increased, and the friction is further reduced. In these embodiments, as shown in FIG. 4(E), the recessed section 6 has a deepest portion 21 that is parallel to the side surface and formed at the center of the recessed section 6, and curved surfaces convex toward the deepest portion 21, i.e., inclined surface portions 22 formed as curved surfaces convex downward in FIG. 4(E), are formed extending from the opposite ends of the deepest portion 21 toward the squeezing portions 20. The inclined surface portions 22 and the squeezing portions 20 are also connected at their boundaries through gently curved surfaces. By forming the inclined surface portions 22 as described above, a higher friction reduction effect can be obtained. However, the inclined surface portions 22 in the seal ring of the present invention are not limited to the structure formed of these curved surfaces and may be formed of single flat surfaces or of flat surfaces and curved surfaces.

In the figure, the deepest portion 21 is formed as a flat surface having a prescribed peripheral length and parallel to the side surface. However, the deepest portion 21 may not be a flat surface. More specifically, the recessed section 6 may be configured to have a central portion formed as an inclined surface portion 22 that includes the deepest portion 21 and is formed as a single curved surface having a shape convex toward the deepest portion 21, i.e., as a single curved surface convex downward in FIG. 4(E), and the opposite ends of the inclined surface portion 22 and the pillar sections 7 may be connected through squeezing portions 20 convex toward the pillar sections 7, i.e., formed of curved surfaces convex upward in FIG. 4(E). However, to obtain a higher friction reduction effect, it is preferable to form the deepest portion 21 as a flat surface parallel to the side surface. In this case, the peripheral width "b" of the deepest portion is 2% to 20% of the peripheral width "a" of one recessed section 6 and more preferably 8% to 16%.

The droop length "c" of the R curved surface of one squeezing portion 20, i.e., the peripheral width from one end of the recessed section 6 to the boundary between the squeezing portion 20 and the corresponding inclined surface portion 22, is preferably 5% to 20% of the peripheral width of an inclined portion on one side of the recessed section 6, i.e., the sum of the peripheral widths (c+d) of the squeezing portion 20 and the inclined surface portion 22. The depth "e" of each squeezing portion 20, i.e., the amount of a reduction in axial level of the boundary point between the squeezing portion 20 and the corresponding inclined surface portion 22, is preferably larger than 0% and equal to and lower than 20% of the depth "h" (the amount of a reduction in axial level) of the deepest portion of the recessed section 6.

The number of recessed sections 6 (the number of recessed sections formed on one side surface of one seal ring) is preferably 4 to 16 and more preferably 6 to 10. The peripheral width "a" of one recessed section 6 is preferably 5 to 20 times the peripheral width "f" of one pillar section 7. The depth "h" of the recessed section 6, i.e., the axial width "h" of the deepest portion 21 of the recessed section 6 is preferably 2% to 20% of the axial width of the seal ring and more preferably 5% to 10%.

FIGS. 4(A) and 4(B) show seal rings of the present invention each having inner walls 8 provided in the recessed sections 6 shown in FIG. 4(D). In the embodiment shown in FIG. 4(A), the inner walls 8 extend from opposite peripheral ends of each recessed section 6 along its inner peripheral edge toward the center of the recessed section 6, and an oil introduction opening 10 that opens on the inner peripheral surface 12 is provided at the center of the recessed section 6. By providing the inner walls 8 on the inner peripheral side (the end) of each recessed section 6, the flow of the squeezed oil from a wedge-shaped inclined surface (squeezing portion) to the inner peripheral surface 12 is suppressed, and a larger lift is thereby generated by a three-dimensional squeezing effect caused by the cross-sectional depth of the wedge and in the circumferential direction. An oil film is formed on each pillar section, and this causes the pillar sections to float up and facilitates introduction of the oil onto an annular sealing surface located on the outer peripheral side of the recessed sections 6. The coefficient of friction is thereby reduced. In addition, hydraulic pressure acts on the recessed sections 6 on the contact side-surface, and the pressing load is thereby reduced. As a result of the synergetic effect of these two effects, the friction is further reduced. In the seal ring of this embodiment, the pillar sections 7 and the recessed sections 6 are connected with a gently inclined R shape formed therebetween. Therefore, by providing the inner walls 8, an improved squeezing effect higher than that obtained by the seal ring in FIG. 3(A) is obtained. The lift is thereby increased, and the friction is further reduced. In this embodiment, the inner walls 8 are formed on the opposite sides of each recessed section 6, i.e., on the opposite sides of each oil introduction opening 10. In this case, the peripheral length of one inner wall 8 is preferably 20% to 45% of the peripheral length of one recessed section 6, and the total length of the inner walls 8 on both sides is preferably 40% to 90% of the total peripheral length of one recessed section 6. In these ranges, a higher wedge-shape effect is obtained, and the friction is further reduced.

The advantageous effects of the present invention are obtained by forming recessed sections 6 each including inner walls 8 and an oil introduction opening 10 on the contact side-surface of the seal ring. The shape of each recessed section 6 in this embodiment is peripherally symmetric with respect to the circumferential center. Therefore, in consideration of workability, it is preferable to provide recessed sections 6 on both the contact side-surface and pressure-receiving side-surface of the seal ring such that each of these side surfaces is symmetric and not directional.

In FIG. 4(A), the inner walls 8 are provided on opposite sides of the recessed section 6. However, as shown in FIG. 4(B), an inner wall 8 may be provided only in the edge portion of an inclined surface (squeezing portion 20) on the rear side in the rotation direction. In this configuration, the clockwise rotation of the seal ring causes the oil to be squeezed toward the end of the squeezing portion 20 on the rear (left) side in the rotation direction, and a lift is thereby generated (the wedge shape effect). The wedge shape effect occurs in the squeezing portion 20 on the rear side in the rotation direction, as described above. However, an oil film is less likely to be formed on the inclined surface on the front side in the rotation direction, and a lubrication state tends to be inhibited. Therefore, in this embodiment in which the inner walls 8 are provided only on the rear side in the rotation direction, the friction is further reduced.

When the inner walls are provided only on the rear side in the rotation direction, the peripheral length of each inner wall 8 is preferably 5% to 95% of the total length of one recessed section and more preferably 50% to 95%. In this range, a higher wedge shape effect is obtained, and the friction is further reduced.

FIG. 4(C) shows a scan image of the contact side-surface of the seal ring in FIG. 4(A). Each inner wall 8 is inclined at an inclination angle of 4° such that its radial width increases from a position about 4 mm from one end of the recessed section 6 toward the one end of the recessed section 6, i.e., such that the radial width of the recessed section decreases. In addition, a sealing surface on the outer peripheral side of the recessed section 6 is inclined at an inclination angle of 3° such that its radial width increases toward the one end of the recessed section 6, i.e., such that the radial width of the recessed section 6 decreases. In this embodiment, since the seal ring includes recessed sections 6 each having a tapered shape in which its radial width decreases toward one end of the recessed section 6 and also the axial width (the depth) decreases toward the one end, the three-dimensional squeezing effect is further improved. Therefore, the lift increases, and the friction is further reduced. In this embodiment, the ends of each recessed section 6 are formed as curved surfaces.

In FIGS. 4(A) and 4(B), the axial level of each inner wall 8 is set to be substantially the same as the level of the side surface of the seal ring, i.e., such that the end surface of the inner wall 8 is flush with a portion of the side surface on which no recessed sections 6 are formed. By arranging the inner walls 8 discontinuously in the circumferential direction, oil introduction openings 10 that open on the inner peripheral surface 12 are formed between the inner walls 8 (FIG. 4(A)) or between the inner walls 8 and the pillar sections 7 (FIG. 4(B)). However, the configuration of the oil introduction openings 10 is not limited to the above configurations. For example, an inner wall 8 may be formed over the entire peripheral portion of each recessed section 6. In this case, an oil introduction opening 10 may be formed by setting the axial level of part of the inner wall 8 to be lower than the level of the side surface of the seal ring.

Figure 5:
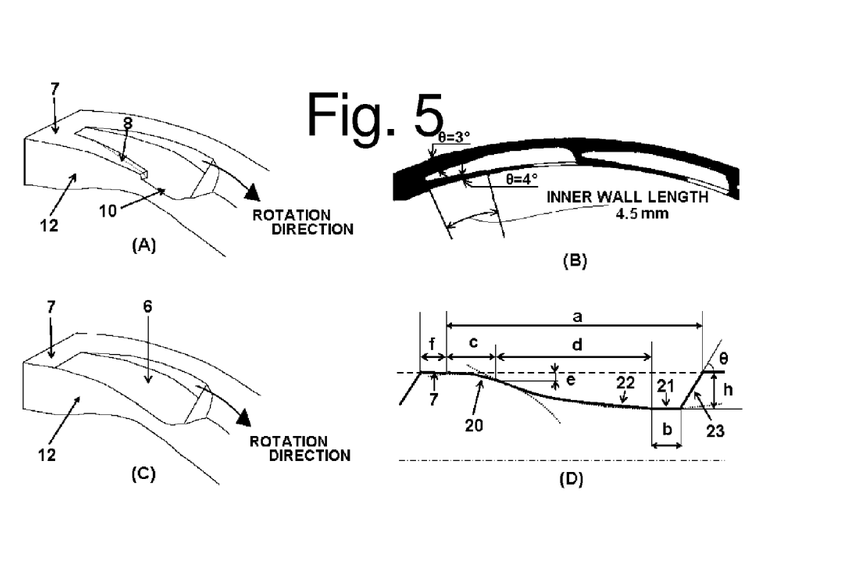
FIG. 5(A) is a perspective view illustrating another embodiment of the seal ring of the present invention.
FIG. 5(B) is a scan image of the contact side-surface of the seal ring in FIG. 5(A)
FIG. 5(C) is a perspective view illustrating the shape of a recessed section of the seal ring in FIG. 5(A)
FIG. 5(D) is a linear development view in the circumferential direction illustrating the shape of the recessed section in FIG. 5(C) as viewed from the inner peripheral surface.

FIG. 5(A) is a perspective view of another embodiment of the seal ring of the present invention, and FIG. 5(B) shows a scan image of the contact side-surface of the seal ring in FIG. 5(A). FIG. 5(C) is a perspective view illustrating the structure of the seal ring in FIG. 5(A) with an inner wall omitted, and FIG. 5(D) is a linear development view in the circumferential direction illustrating the seal ring in FIG. 5(A) with the inner wall omitted, as viewed from the inner peripheral surface. This embodiment is different in the shape of the recessed sections from the embodiments in FIGS. 3 and 4. In this embodiment, as shown in FIG. 5(D), one end portion of the recessed section 6 is formed as a curved surface convex toward a pillar section 7, i.e., as a squeezing portion 20 formed of a curved surface convex upward in the linear development view (FIG. 5(D)) in the circumferential direction viewed from the inner peripheral surface, and is connected to the pillar section 7. The other end of the recessed section 6 is connected to a pillar section 7 through a steep inclined surface 23 extending from a deepest portion 21 to the pillar section 7. In the seal ring of this embodiment, a gently inclined surface including the squeezing portion 20 is disposed on the rear side in the rotation direction, and the steep inclined surface 23 is disposed on the front side in the rotation direction. Therefore, the rotation of the seal ring causes the oil to be squeezed toward the end of the squeezing portion 20 on the rear side in the rotation direction. A lift is thereby generated (the wedge shape effect), and the friction is reduced. In this embodiment, the recessed sections 6 are connected to the pillar sections 7 through gently inclined curved surfaces. Therefore, by providing inner walls 8 as shown in FIG. 5(A), the squeezing effect is improved. The lift is thereby increased, and the friction is further reduced. In this embodiment, the end portion of each recessed section 6 on the front side in the rotation direction is formed as a steep inclined surface 23. More specifically, the amount of the inclined surface on the front side in the rotation direction, which inclined surface is not expected to provide the wedge shape effect, is reduced as much as possible, and most part of the structure of each recessed section 6 is formed as an inclined surface having the wedge shape effect. This allows a further improvement in the wedge shape effect, and the friction can thereby be reduced. The friction reduction effect can be obtained by reducing the area of the inclined surface that does not provide the wedge shape effect. However, in consideration of releasability etc., the inclination angle θ of the inclined surface 23 on the front side in the rotation direction, i.e., the angle between the inclined surface 23 and the side surface of the seal ring is preferably 8° to 45°.

In FIG. 5(D), the deepest portion 21 is formed as a flat surface having a prescribed peripheral length "b" and parallel to the side surface. An inclined surface portion 22 having a shape convex toward the deepest portion 21, i.e., formed of a curved surface convex downward in FIG. 5(D), is formed extending from one end of the deepest portion 21 on the rear side in the rotation direction toward the squeezing portion 20. The inclined surface portion 22 and the squeezing portion 20 are connected at their boundary through a gently curved surface. By forming the inclined surface portion 22 as described above, a higher friction reduction effect can be obtained. However, the inclined surface portions 22 in the seal ring of the present invention are not limited to the above-described curved surfaces and may be formed of single flat surfaces or of flat surfaces and curved surfaces.

In the figure, the deepest portion 21 is formed as a flat surface having a prescribed peripheral length "b" and parallel to the side surface. However, the deepest portion 21 may not be a flat surface. For example, each recessed section 6 may be configured as follows. A portion between the end of the recessed section 6 on the rear side in the rotation direction and the boundary between the squeezing portion 20 and the inclined surface portion 22 is formed as a curved surface convex toward a pillar section 7, i.e., convex upward in FIG. 5(D). The inclined surface portion 22 is formed as a single curved surface that has a shape convex toward the deepest portion 21, i.e., is convex downward in FIG. 5(D), and extends from the boundary between the squeezing portion 20 and the inclined surface portion 22 to the deepest portion 21. The recessed section 6 is connected to a pillar section 7 through the steep inclined surface 23 immediately after the inclined surface portion 22 reaches the deepest portion 21. However, to obtain a higher friction reduction effect, it is preferable to form the deepest portion 21 as a flat surface parallel to the side surface. In this case, the peripheral width "b" of the deepest portion 21 is 2% to 20% of the peripheral width "a" of one recessed section 6 and more preferably 8% to 16%.

The droop length "c" of the R curved surface of one squeezing portion 20, i.e., the peripheral width from one end of the recessed section 6 to the boundary between the squeezing portion 20 and the inclined surface portion 22, is preferably 5% to 20% of the sum of the peripheral widths (c+d) of the inclined portions (the squeezing portion 20 and the inclined surface portion 22) on the rear side in the rotation direction. The depth "e" of each squeezing portion 20, i.e., the amount of a reduction in axial level of the boundary between the squeezing portion 20 and the inclined surface portion 22, is preferably larger than 0% and equal to and lower than 20% of the depth "h" (the amount of a reduction in axial level) of the deepest portion 21 of the recessed section 6.

The number of recessed sections 6 (the number of recessed sections formed on one side surface of one seal ring) depends on the size of the seal ring. In a seal ring having an outer diameter (nominal diameter) of about 20 to about 70 mm, the number of recessed sections 6 is preferably 4 to 16. The peripheral width "a" of one recessed section 6 is preferably 5 to 20 times the peripheral width "f" of one pillar section 7. The depth "h" of the recessed section 6, i.e., the amount of a reduction in the axial level of the deepest portion 21 of the recessed section 6, is preferably 2% to 20% of the axial width of the seal ring and more preferably 4% to 10%.

FIG. 5(A) shows a seal ring of the present invention having inner walls 8 provided in the recessed sections 6 in FIG. 5(C). In the embodiment shown in FIG. 5(A), the inner wall 8 extends peripherally from the end of the inclined portion including the squeezing portion 20 and the inclined surface portion 22 along the inner peripheral edge, and an oil introduction opening 10 that opens on the inner peripheral surface 12 is provided in the recessed section 6 and disposed on the front side in the rotation direction. By providing the inner wall 8 on the inner peripheral side (end) of each recessed section 6, the flow of the squeezed oil from the wedge-shaped inclined surface (squeezing portion) to the inner peripheral surface 12 is suppressed, and a larger lift is thereby generated by a three-dimensional squeezing effect caused by the cross-sectional depth of the wedge and in the circumferential direction. An oil film is thereby formed on each pillar section 7. This causes the pillar sections 7 to float up and facilitates introduction of the oil onto an annular sealing surface located on the outer peripheral side of the recessed sections 6. Then the lubrication state of the sealing surface is changed to a fluid lubrication state, and the coefficient of friction is thereby reduced. In addition, hydraulic pressure acts on the recessed sections 6 on the contact side-surface, and the pressing load is thereby reduced. As a result of the synergetic effect of these two effects, the friction is further reduced. In the seal ring of this embodiment, each recessed section 6 and a pillar section 7 on the rear side in the rotation direction are connected with a gently inclined R shape formed therebetween. Therefore, by providing the inner walls 8, lubrication is further facilitated as compared to that of the seal ring shown in FIG. 3(A). The coefficient of friction is thereby reduced, and the friction is further reduced.

In this embodiment, the inner walls 8 are provided only on the inclined surfaces on the rear side in the rotation direction. The clockwise rotation of the seal ring causes the oil to be squeezed toward the end of each squeezing portion on the rear (left) side in the rotation direction, and a lift is thereby generated (the wedge shape effect). As described above, the wedge shape effect occurs in the squeezing portion 20 on the rear side in the rotation direction. However, an oil film is less likely to be formed on the inclined surface on the front side in the rotation direction, and a lubrication state tends to be inhibited. Therefore, by providing the inner walls only on the rear side in the rotation direction, the friction is further reduced. In addition, in each recessed section 6 in this embodiment, the amount of the inclined surface on the front side in the rotation direction, which inclined surface is not expected to provide the wedge shape effect, is reduced as much as possible, and most part of the structure of the recessed section 6 is formed as an inclined surface having the wedge shape effect. Therefore, by providing the inner walls 8, the wedge shape effect is further improved, and the friction can be reduced.

The peripheral length of each inner wall 8 is preferably 5% to 95% of the peripheral length of one recessed section 6 and more preferably 50% to 95%. In this range, a higher wedge shape effect is obtained, and the friction is further reduced.

FIG. 5(B) shows a scan image of the contact side-surface of the seal ring in FIG. 5(A). Each inner wall 8 is inclined at an inclination angle of 4° such that its radial width increases from a position about 4.5 mm from one end of the recessed section 6 that is close to the inclined portion including the squeezing portion 20 and inclined surface portion 22 toward the one end of the recessed section 6, i.e., such that the radial width of the recessed section 6 decreases. In addition, a sealing surface on the outer peripheral side of the recessed section 6 is inclined at an inclination angle of 3° such that its radial width increases toward the one end of the recessed section 6, i.e., such that the radial width of the recessed section 6 decreases. As described above, since the seal ring of this embodiment includes recessed sections 6 each having a tapered shape in which its radial width decreases toward one end and also the axial width (the depth) decreases toward the end, the three-dimensional squeezing effect is further improved. Therefore, the lift increases, and fluid lubrication is achieved, resulting in a further reduction in friction. In this embodiment, the ends of each recessed section 6 are formed as curved surfaces.

In the figures, the axial level of the inner wall 8 is set to be substantially the same as the level of the side surface, i.e., such that the end surface of the inner wall 8 is flush with a portion of the side surface on which no recessed sections 6 are formed. In addition, the inner wall 8 is disposed in a circumferential part of the recessed section 6 (on the rear side in the rotation direction), and an oil introduction opening 10 that opens on the inner peripheral surface 12 is formed between the inner wall 8 and a pillar section 7. However, the configuration of the oil introduction opening 10 is not limited to the above configuration. An inner wall 8 may be formed over the entire peripheral portion of each recessed section 6. In this case, an oil introduction opening 10 may be formed by setting the axial level of part of the inner wall 8 to be lower than the level of the side surface of the seal ring.

Figure 6:
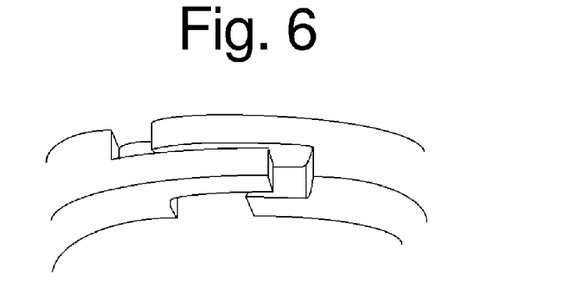
FIG. 6 is a perspective view illustrating an embodiment of the abutment joint of the seal ring of the present invention.

In consideration of attachability, the seal ring of the present invention has an abutment joint. However, no particular limitation is imposed on the shape of the abutment joint. A right-angle (straight) abutment joint, an inclined (angle) abutment joint, and a stepped abutment joint may be used, and a double angle abutment joint, a double cut abutment joint, a triple step abutment joint shown in FIG. 6, etc. may also be used. To block the flow of oil into the gap of the abutment joint to thereby improve the sealing characteristics, a double angle abutment joint, a double cut abutment joint, and a triple step abutment joint are preferred.

No particular limitation is imposed on the material of the seal ring of the present invention. Any of polyether ether ketone (PEEK), polyphenylene sulfide (PPS), and polyimide (PI) may be used, and any of fluorine-based resins such as polytetrafluoroethylene (PTFE), modified polytetrafluoroethylene, and ethylene tetrafluoroethylene (ETFE) may also be used. Generally, a material obtained by adding an additive such as carbon powder or carbon fibers to any of the above resins is preferably used.

No particular limitation is imposed on a method of producing the seal ring of the present invention. However, when a thermoplastic resin such as PEEK, PPS, or PI is used as the material of the seal ring, it is preferable to produce the seal ring by injection molding. By using a mold for injection molding, a seal ring having a complex inner wall structure can be easily produced. When a fluorocarbon resin is used, a seal ring can be produced by compression molding followed by machining.

EXAMPLES

The present invention will be described in more detail by way of the following Examples. However, the invention is not limited to these Examples.

Example 1

A seal ring having a recessed section shape structure shown in FIG. 3(A) was produced by injection molding using a PEEK material including carbon fibers added thereto. The inclination angle θ of the recessed sections was set to 16°, and the depth "h" of the deepest inclined portions 52 was set to 0.42 mm. Eight recessed sections were formed on the contact side-surface. Inner walls having a width of 0.3 mm and a peripheral length of 10 mm were provided in each recessed section. The inner walls extended from the peripheral ends of the recessed section along its inner peripheral edge toward the center of the recessed section, and an oil introduction opening having a peripheral length of 3 mm was thereby formed at the center. The outer diameter (nominal diameter) of the seal ring was 67 mm, the thickness (radial width) was 2.3 mm, and the width (axial width) was 2.32 mm. The triple step abutment joint shown in FIG. 6 was employed.

Example 2

A seal ring having a recessed section shape structure shown in FIG. 4(A) was produced by injection molding using a PEEK material including carbon fibers added thereto. Eight recessed sections each including squeezing portions having a radius of curvature of R40 and a deepest portion having a depth of 0.22 mm were formed. Inner walls having a width of 0.3 mm and a peripheral length of 10 mm were provided in each recessed section. The inner walls extended from the opposite peripheral ends of the recessed section along its inner peripheral edge toward the center of the recessed section, and an oil introduction opening having a peripheral length of 3 mm was thereby formed at the center. The outer diameter (nominal diameter) of the seal ring was 67 mm, the thickness (radial width) was 2.3 mm, and the width (axial width) was 2.32 mm. The triple step abutment joint shown in FIG. 6 was employed.

Example 3

A seal ring having a recessed section shape structure shown in FIG. 5(A) was produced by injection molding using a PEEK material including carbon fibers added thereto. Eight recessed sections each including a squeezing portion having a radius of curvature of R100 and a deepest portion having a depth of 0.15 mm were formed. An inner wall having a width of 0.3 mm and a peripheral length of 20 mm was provided in each recessed section. The inner wall extended from the end of the recessed section on the rear side in the rotation direction along the inner peripheral edge of the recessed section, and an oil introduction opening having a peripheral length of 2 mm was thereby formed on the front side in the rotation direction. The outer diameter (nominal diameter) of the seal ring was 67 mm, the thickness (radial width) was 2.3 mm, and the width (axial width) was 2.32 mm. The triple step abutment joint shown in FIG. 6 was employed.

(Measurement of Friction and Amount of Oil Leakage)

Figure 7:
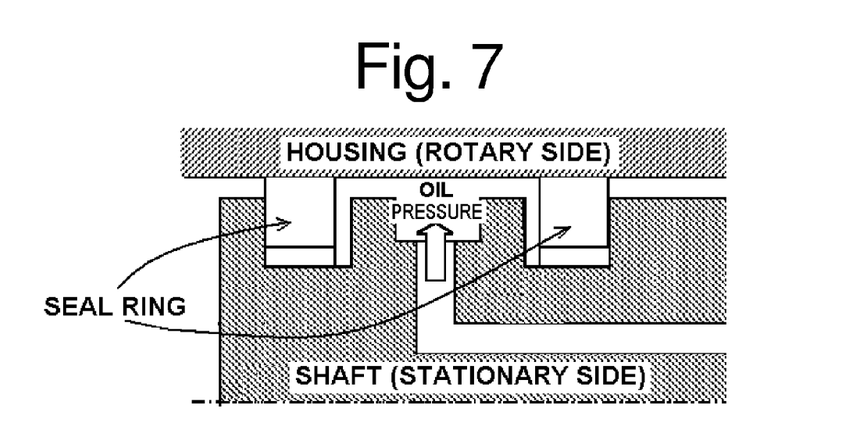
FIG. 7 is a schematic diagram illustrating a friction measurement apparatus.

One of the seal rings in Examples 1 to 3 was attached to a shaft groove formed on the outer peripheral surface of a stationary shaft (made of S45C) having a hydraulic circuit provided therein, as shown in FIG. 7, and the stationary shaft was placed in a test apparatus. Then a housing (made of S45C) was attached and rotated at the number of revolutions of 2,000 rpm, and the loss of rotation torque was detected using a torque detector attached to the test apparatus. Simultaneously, the amount of oil leakage was measured. The oil used was an automatic transmission fluid (ATF). The temperature of the oil was set to 80° C., and the pressure of the oil was set to 0.8 MPa. For comparison purposes, the measurement of the friction and the amount of oil leakage was similarly performed on a seal ring having the same recessed section shape as that in Example 1 with no inner walls provided (Comparative Example 1) and on a seal ring having a trapezoidal cross-section with its opposite side surfaces being inclined at an inclination angle of 5° such that the axial width of the seal ring decreased from the outer peripheral side toward the inner peripheral side (Comparative Example 2).

Figure 8:
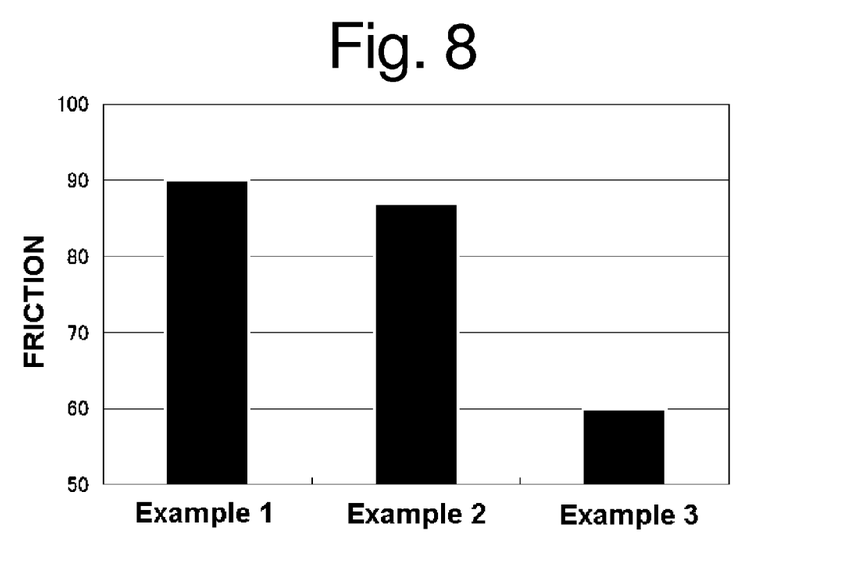
FIG. 8 is a graph showing the results of measurement of the friction of seal rings in Examples 1 to 3.

FIG. 8 shows the results of the measurement of the friction of the seal ring in each of Examples 1 to 3. The vertical axis represents a relative friction value while the friction of the seal ring in Comparative Example 1 having the same recessed section shape as that in Example 1 and having no inner walls is set to 100. In Example 1, the friction was reduced by about 10% as compared to the friction in Comparative Example 1, and the friction reduction effect obtained by providing the inner walls was found. In Example 2, the friction was further reduced, and it was found that a friction reduction effect higher than that in Example 1 was obtained.

Figure 9:
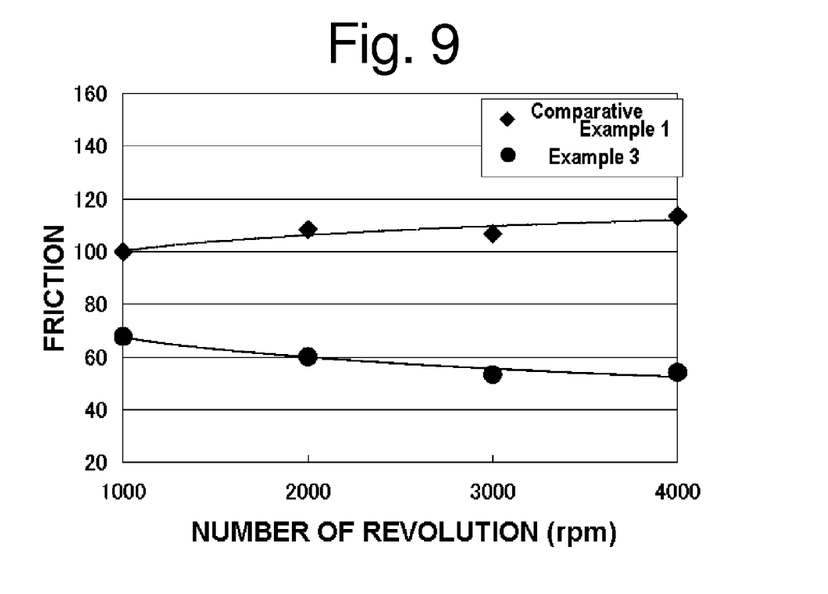
FIG. 9 is a graph showing the relation between the number of revolutions and friction of seal rings in Example 3 and Comparative Example 1.

This may be because of the following reasons. In Example 2, the end portions of the recessed sections are formed of curved surfaces convex toward the pillar sections, and the pillar sections and the recessed sections are connected at a gentle inclination angle. Therefore, by providing the inner walls, the oil is more effectively squeezed toward the end portions of the recessed sections. This allows an increase in the lift, facilitates the formation of oil films on the pillar sections, and lubricates the sealing surface, and the coefficient of friction is thereby reduced. In Example 3, the friction was reduced by about 40% as compared to the friction in Comparative Example 1, and the friction reduction effect obtained was higher than those in Examples 1 and 2. FIG. 9 shows the results of measurement of the friction of the seal ring of Example 3 at different numbers of revolutions between 1,000 rpm to 4,000 rpm. For comparison purposes, the measurement of friction was similarly performed on the seal ring of Comparative Example 1, and the results of the measurement are also shown in FIG. 9. In FIG. 9, the vertical axis represents a relative friction value when the friction of the seal ring in Comparative Example 1 at 1,000 rpm is set to 100. As can be seen from FIG. 9, in the conventional seal ring in Comparative Example 1, as the number of revolutions increases, the friction increases. However, in the seal ring of Example 3, there is a tendency that the friction decreases as the number of revolutions increases. This may be because of the following reasons. In the seal ring of Example 3, the gently inclined surfaces having the wedge shape effect were formed only on the rear side in the rotation direction on which a high oil squeezing effect could be achieved and an oil film was easily formed, and also the inner walls were provided. Therefore, the lift was effectively generated with no influence of lubrication inhibition on the front side in the rotation direction. The thickness of the oil film formed on the pillar sections was thereby increased, and fluid lubrication was achieved. In the fluid lubrication state, the lift and the thickness of the oil film increase as the number of revolutions increases. This may result in a reduction in friction.

The friction of the seal ring of each of Examples 1 to 3 was equal to or less than the friction of the seal ring of Comparative Example 2 having a trapezoidal cross-section. Therefore, it was found that, according to the present invention, the amount of a reduction in friction can be equal to or higher than that in the conventional low-friction seal ring.

The cancelling areas of the seal rings of Examples 1 to 3 were 83.5%, 78.2%, and 80.4%, respectively, of the cancelling area of the seal ring of Comparative Example 1 and were smaller by about 20% than that in Comparative Example 1. The cancelling area is a secondary area, i.e., a projected area, in the planar image of recessed sections used as an oil reservoir and can be computed by image processing after only the recessed sections are colored. Generally, the larger the cancelling area, i.e., the larger the area on which hydraulic pressure acts, the larger the pushing back force serving as a counterforce pressure. Therefore, as the cancelling area increases, the pressurizing load decreases, and the friction decreases. However, it was found that the use of the inner walls in the present invention can reduce the friction even when a smaller cancelling area was used. This may be because, in the seal ring of the present invention, the friction reduction effect depends more largely on a reduction in the coefficient of friction by lubrication of the sliding surface than on a reduction in the pressing force. As described above, in the seal ring of the present invention, the friction can be reduced using a smaller cancelling area. Therefore, as compared to the conventional seal rings in which their characteristics largely depend on the cancelling area, the limitation characteristics can be further improved, and the amount of wear can be further reduced.

The amount of oil leakage in the seal ring of each of Example 1 to 3 was significantly lower than (about one-third of) the amount of oil leakage in Comparative Example 2 in which a trapezoidal cross-section was used.

Therefore, it was found that the seal ring of the present invention has excellent low-leakage characteristics or sealing characteristics.

Examples 4 to 6

Figure 10:
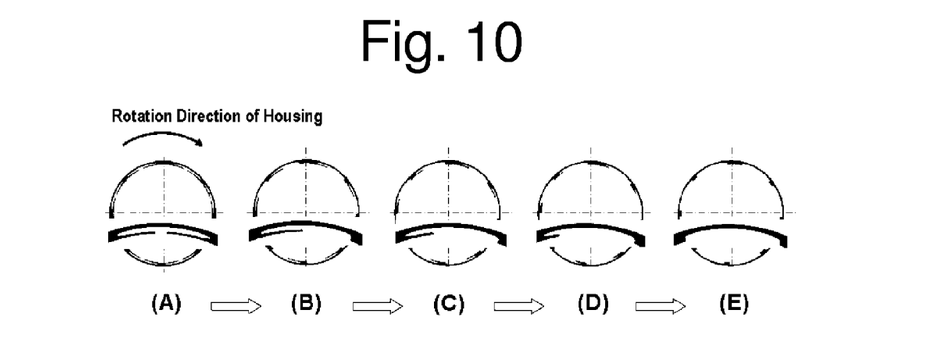
FIGS. 10(A) to 10(E) are scan images of the contact side-surfaces of seal rings in Examples 2 and 4 to 6 and Comparative Example 3, respectively.

Seal rings having the same configuration as in Example 2 except that inner walls having peripheral lengths of 10 mm (B), 6.6 mm (C), and 3.3 mm (D) were provided only on the rear side in the rotation direction as shown in FIG. 10 were produced (Examples 4, 5, and 6). The peripheral length of the recessed sections was 23 mm. Therefore, the peripheral lengths of the inner walls in Examples 4, 5, and 6 correspond to 43%, 29%, and 14% of the peripheral length of the recessed sections, respectively. The friction of each of the seal rings was measured as in Example 1. For comparison purposes, the measurement of friction was similarly performed on a seal ring having the same recessed section shape as that in Example 2 with no inner walls provided (Comparative Example 3).

Figure 11:
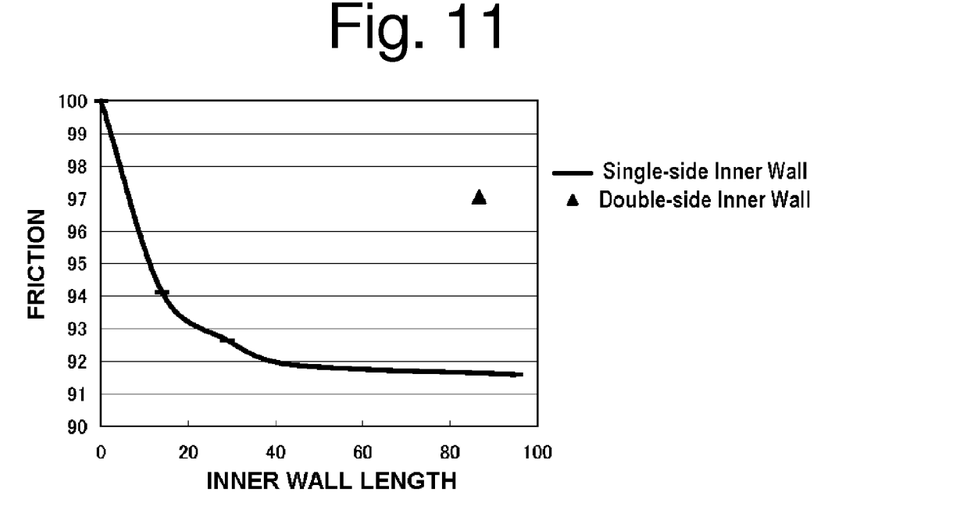
FIG. 11 is a graph showing the relation between the length of an inner wall and friction.

FIG. 11 shows the relation between the length of the inner walls and friction. In FIG. 11, the length of the inner walls is represented by a relative value with the peripheral length of the recessed sections being set to 100, and the friction is represented by a relative value with the friction in Comparative Example 3 in which no inner walls are provided being set to 100. The value in Example 2 in which inner walls are provided on opposite sides of the recessed sections is also shown in FIG. 11. The friction reduction effect obtained was higher in Example 2 in which the inner walls were provided on opposite sides and in each of Examples 4 to 6 in which the inner walls were provided only on one side (the rear side in the rotation direction) than in Comparative Example 3 in which no inner walls were provided. In Examples 4 to 6 in which the inner walls were provided only on the rear side in the rotation direction, the amount of a reduction in friction was found to be higher than that in Example 2 in which the inner walls were provided on opposite sides of the recessed sections, and the friction was found to be lower.

This may be because of the following reasons. On the rear side in the rotation direction, the lift caused by the wedge shape is large. On the front side in the rotation direction, the lift generated by the wedge shape is small, the oil film is less likely to be formed on each inclined surface, and the lubrication state tends to be inhibited. Therefore, when inner walls are provided only on the rear side in the rotation direction and no inner walls are provided on the front side in the rotation direction, the sealing surface is lubricated. It was also found that, when the inner walls were provided only on the rear side in the rotation direction, a higher friction reduction effect was obtained by setting the peripheral length of the inner walls to 5% to 95% of the peripheral length of the recessed sections and preferably 50% to 95%. Generally, the pressurizing load is reduced by increasing the cancelling area to increase the cancelling load, and the friction is thereby reduced, as described above. However, in the seal ring of the present invention, a higher friction reduction effect was obtained by increasing the length of the inner walls, i.e., reducing the cancelling area. This may be because the flow of the oil to the inner peripheral surface is suppressed by providing the inner walls, so that the oil is efficiently introduced onto the inclined surfaces of the squeezing portions. Therefore, the rotation of the seal ring causes a larger lift to be generated, so that the formation of oil films on the pillar sections is facilitated. The formation of the oil films on the pillar sections causes the inner peripheral side of the seal ring to float up and facilitates introduction of the oil onto the annular sealing surface located on the outer peripheral side of the recessed sections. This causes the sliding surface to be fluid-lubricated. The coefficient of friction is thereby reduced, and a high friction reduction effect is obtained.

1 Seal ring
2 Shaft
3 Hydraulic passage
4 Shaft groove
5 Housing
6 Recessed section (pocket)
7 Pillar section
8 Inner wall
10 Oil introduction opening
11 Pressure receiving side-surface
12 Inner peripheral surface
14 Contact side-surface
20 Squeezing portion
21 Deepest portion
22 Inclined surface portion
51 Deepest inclined portion
52 Converging portion
60 Lift
61 Cancelling pressure

The invention claimed is:

1. A seal ring attached to a shaft groove formed on an outer peripheral surface of a shaft, the seal ring comprising a plurality of peripherally spaced recessed sections formed on at least an inner peripheral side of a contact side-surface of the seal ring, wherein each of the recessed sections comprises an inner wall and an oil introduction opening that opens on an inner peripheral surface of the seal ring, the inner wall and the oil introduction opening being disposed on an inner peripheral side of the each of the recessed sections,
   a pillar section is disposed between adjacent ones of the plurality of recessed sections and each pillar section has a same surface as the contact side-surface, and
   the inner wall has the same surface as the contact side-surface.

2. The seal ring according to claim 1, wherein the inner wall comprises inner walls disposed on opposite peripheral sides of each of the recessed sections.

3. The seal ring according to claim 2, wherein a peripheral length of each of the inner walls is 20% to 45% of the peripheral length of each of the recessed sections.

4. The seal ring according to claim 3, wherein a radial width of the inner wall increases toward a peripheral end of each of the recessed sections.

5. The seal ring according to claim 3, wherein one peripheral end of each of the recessed sections each having the inner wall disposed therein includes a squeezing portion formed of a curved surface convex toward a pillar section.

6. The seal ring according to claim 2, wherein a radial width of the inner wall increases toward a peripheral end of each of the recessed sections.

7. The seal ring according to claim 2, wherein one peripheral end of each of the recessed sections each having the inner wall disposed therein includes a squeezing portion formed of a curved surface convex toward a pillar section.

8. The seal ring according to claim 1, wherein the inner wall is disposed on one of peripheral sides of each of the recessed sections.

9. The seal ring according to claim 8, wherein a peripheral length of the inner wall is 5% to 95% of a peripheral length of each of the recessed sections.

10. The seal ring according to claim 9, wherein a radial width of the inner wall increases toward a peripheral end of each of the recessed sections.

11. The seal ring according to claim 9, wherein one peripheral end of each of the recessed sections each having the inner wall disposed therein includes a squeezing portion formed of a curved surface convex toward a pillar section.

12. The seal ring according to claim 8, wherein a radial width of the inner wall increases toward a peripheral end of each of the recessed sections.

13. The seal ring according to claim 1, wherein a radial width of the inner wall increases toward a peripheral end of each of the recessed sections.

14. The seal ring according to claim 8, wherein one peripheral end of each of the recessed sections each having the inner wall disposed therein includes a squeezing portion formed of a curved surface convex toward a pillar section.

15. The seal ring according to claim 13, wherein one peripheral end of each of the recessed sections each having the inner wall disposed therein includes a squeezing portion formed of a curved surface convex toward a pillar section.

16. The seal ring according to claim 1, wherein one peripheral end of each of the recessed sections each having the inner wall disposed therein includes a squeezing portion formed of a curved surface convex toward a pillar section.

* * * * *